United States Patent [19]

Hirai

[11] Patent Number: 5,012,268
[45] Date of Patent: Apr. 30, 1991

[54] EXPOSURE CONTROL DEVICE FOR INTERCHANGEABLE LENS CAMERA

[75] Inventor: Isamu Hirai, Tokyo, Japan

[73] Assignee: Asaha Kogaku Kogyo Kabushiki Kaisha, Tokyo, Japan

[21] Appl. No.: 534,327

[22] Filed: Jun. 5, 1990

Related U.S. Application Data

[63] Continuation of Ser. No. 394,287, Aug. 11, 1989, abandoned, which is a continuation of Ser. No. 309,896, Feb. 8, 1989, abandoned, which is a continuation of Ser. No. 129,205, Dec. 7, 1987, abandoned.

[30] Foreign Application Priority Data

Dec. 5, 1986 [JP] Japan .................. 61-288903

[51] Int. Cl.⁵ .................. G03B 7/091; G03B 7/20
[52] U.S. Cl. .................. 354/410; 354/286
[58] Field of Search .......... 354/410, 412, 429–434, 354/455, 286

[56] References Cited

U.S. PATENT DOCUMENTS

| Re. 32,376 | 3/1987 | Fukuhara et al. | 354/432 |
|---|---|---|---|
| 4,529,288 | 7/1985 | Nakai et al. | 354/286 X |
| 4,636,054 | 1/1987 | Saegusa | 354/432 |

FOREIGN PATENT DOCUMENTS 3105893 1/1982 Fed. Rep. of Germany .
3518887 9/1986 Fed. Rep. of Germany .

OTHER PUBLICATIONS

Patent Abstracts of Japan, vol. 8, No. 147 (P-285) [1584], 10th Jul. 1984; and JP-5946634 (Minolta Camera) Mar. 16, 1984.
Patent Abstracts of Japan, vol. 7, No. 196 (P-219) [1341], 26th Aug. 1983; and JP-A-5895721 (Canon) Jun. 7, 1983.

Primary Examiner—W. B. Perkey
Attorney, Agent, or Firm—Sughrue, Mion, Zinn, Macpeak & Seas

[57] ABSTRACT

An exposure control device for an interchangeable-lens camera in which factors preventing the establishment of a relationship which ensures proper matching of the photographing lens and the camera body on both the lens side and the camera body side are taken into account. Memories are provided both in the lens and the camera body for storing values characterizing the lens and camera body with respect to parameters such as focal length, exit pupil position, vignetting factor, and open-aperture F number. Specific equations are disclosed for carrying out corrections.

17 Claims, 5 Drawing Sheets

EXPOSURE CONTROL DEVICE FOR INTERCHANGEABLE LENS CAMERA

This is a continuation of application Ser. No. 07/394,287 filed Aug. 11, 1989, now abandoned, which is a continuation of application Ser. No. 07/309,896 filed Feb. 8, 1989, now abandoned, which is a continuation of application Ser. No. 07/129,205 filed Dec. 7, 1987, now abandoned.

BACKGROUND OF THE INVENTION

The present invention relates to an exposure control device for an interchangeable-lens camera with which a variety of photographing lenses can be selectively used according to photographing conditions.

Most recent lens-interchangeable cameras have an automatic exposure control capability. In the case of a TTL (through the lens) photometric interchangeable-lens camera, light entering through the photographing lens is measured at a predetermined position in the camera body to obtain a photometric output ip, which is utilized for exposure control.

For exposure control, in general, the exposure value $E_v$ is obtained from the following equation (1):

$$E_v = \log_2 ip/(ips - B_{v6}) + 6 + S_v + A_{vmin} - A_{vsmin} - L_{fv} \quad (1)$$

where:
ip is the photometric output provided when a photographing lens is used,
$ips - B_{v6}$ is the photometric output with respect to $B_{v6}$ of a calibrating reference lens,
6 is the $B_v$ value,
$S_v$ is the film speed value index APEX,
$A_{vmin}$ is the open-aperture F number APEX of the photographing lens,
$A_{vsmin}$ is the open-aperture F number APEX of the calibrating reference lens, and
$L_{fv}$ is the amount of correction for a reduction in the average illuminance on a film surface by relative focal plane illuminance.

To obtain the proper exposure value from equation (1), the open aperture F number $A_{vmin}$ of the photographing lens and the photometric output ip obtained through the photographing lens should satisfy the following relation:

$$2A_{vmin} \propto 1/ip \quad (2)$$

This will be described concretely. If, for instance, the photometric output obtained through a photographing lens having an open-aperture F number of 2 is 40 nA, and this photographing lens is replaced by a photographing lens having an open-aperture F number of 2.8, the photometric output obtained through the latter photographing lens should be 20 nA. However, in most cameras, the above-described relation is not established.

FIG. 1 is a characteristic diagram indicating open-aperture F numbers in APEX with differences between the photometric outputs of a variety of photographing lenses and the ideal photometric output provided when relation (2) is established. In FIG. 1, the open-aperture F numbers are plotted on the horizontal axis and the differences on the vertical axis. In the case where the photometric output ip obtained through a photographing lens satisfies relation (2), the difference between the photometric output ip and the ideal photometric output should be zero. However, as is apparent from FIG. 1, the actual photometric output differs from the ideal photometric output.

There are various factors which can contribute to the failure to satisfy relation (2). Both the photographing lens and the camera body have such factors.

In the case of the photographing lens, such factors, for example, include:
(1) A first factor attributed to the $\cos^4$ law. That is, different photographing lenses have different focal lengths, thus providing different photometric outputs.
(2) Different photographing lenses have different exit pupil positions. Therefore, with different photographing lenses, the incident light beam can differ in incident angle on the detector, causing different photometric outputs to be obtained.
(3) Different photographing lenses have different vignetting factors, again causing different photometric outputs.
(4) The photometric output depends on the open-aperture F number.
(5) Transmittances differ among lenses.

The total transmittance includes that of the photographing lens. For a TTL photometric operation, the transmittance of the photographing lens causes no problem because photometry is effected at a predetermined position in the camera body after the light beam has passed through the lens. However, in the case where a photometric system outside the camera is used, the transmittance must be taken into consideration.

In the case of the camera body, a significant factor is that optical components such as the focusing screen or pentaprism positioned in the optical path prior to the photometric point do not always have constant optical characteristics. That is, different camera bodies can have different optical characteristics, thus causing different photometric outputs.

Accordingly, it is necessary to correct the deviation from relation (2) caused by the above-described factors.

Heretofore, the amounts of deviation caused by these various factors were not individually taken into account, and instead a single correction datum for each lens was stored in a lens ROM provided in the photographing lens. Otherwise, protrusions were provided on the photographing lens side to change the resistance of a variable resistor on the lens body side to indicate a correction value.

An interchangeable lens camera must of course be able to use a variety of photographing lenses mounted on its body. Therefore, in such a camera, it is necessary to correct the amount of deviation from relation (2) whenever a different photographing lens is mounted on the camera body. On the other hand, in the case where a single type of photographing lens is employed, there are still deviations from relation (2) attributed to the camera body.

Let us consider the case where photographing operations are carried out by using in combination three different kinds of photographing lenses and three camera bodies picked up from different lots although they are of the same model and basic type. In this case, different combinations result in different types and amounts deviation from relation (2).

Furthermore, let us consider the case in which one photographing lens is to be used with a new camera body employing a different photographing system from the camera body presently in use. If, in this case, the old camera body is of the averaging photometry type and the new camera body is of the spot photometry type, the combination of the one photographing lens and the new camera body will almost inevitably result in a deviation from relation (2); that is, it is impossible to perform photographing operations with a high accuracy when the camera body is changed.

Moreover, when a new camera body is used having a different photometry system, a similar problem results.

The inventor has conducted intensive research on the above-described factors (1) through (4) on the photographing lens side and obtained results as illustrated in FIGS. 2 through 5.

FIG. 2 is a graphical representation showing a characteristic curve indicating the effects of the $\cos^4$ law. This graphical representation was formed as follows: First, light from an object of constant luminance was measured at a predetermined position in a camera body through a plurality of a photographing lenses of different focal lengths so as to obtain exposure values. The relations between the focal lengths and the differences obtained by subtracting the exposure values $E_v$ from a certain reference value D are plotted. As is apparent from FIG. 2, the differences depend on the focal length f.

FIG. 3 is a graphical representation showing a characteristic curve indicating the effects of the exit pupil position. In the case of FIG. 3, the distance of the exit pupil from the film surface was changed to determine the level of exposure at various positions, and the relation between the exit pupil position and the differences obtained by subtracting the exposure level $E_v$ from a certain reference value D are plotted. It is clear from FIG. 3 that the differences depend on the exit pupil position.

FIG. 4A is a graphical representation indicating the effects of vignetting factor. In the case of FIG. 4A, a variety of photographing lenses were combined with a camera body, the exposure levels $E_v$ measured, vignetting factor with an image obtained, and the relations between the vignetting factor with an image height set to 6 mm and the differences obtained by subtracting the exposure values $E_v$ from a predetermined reference value D plotted. In FIG. 4A, reference numerals designate the numbers of the photographing lenses used. It can be understood from this graphical representation that, as the vignetting factor decreases, i.e., as the peripheral quantity of light decreases, the exposure level becomes excessive. FIG. 4B was formed by approximation of the characteristic curve of FIG. 4A.

Thus, with respect to focal length, exit pupil position and vignetting factor, it has been found that, by effecting corrections in such a manner that the variations in difference as shown in FIGS. 2 through 5 are eliminated, the establishment of the above-described relation (2) will be achieved.

An investigation was conducted on the effects of the open-aperture F number as follows: a variety of photographing lenses having different open-aperture F numbers were provided, and, for each photographing lens, corrections were made as described above so that the effects of the exit pupil position, vignetting factor and focal length were eliminated. Thereafter, light from an object of constant luminance was measured through the photographing lenses to obtain exposure levels $E_v$. FIG. 5 is a graphical representation showing a characteristic curve which indicates the relations between open-aperture F numbers and the differences obtained by subtracting the exposure levels $E_v$ from a certain reference value D. It is apparent from FIG. 5 that the differences depend on the open-aperture F number $A_v$.

With respect to the camera body, it has been found that selecting the deviation from the above-described relation (2) can be reduced by controlling camera bodies separately in each of manufacturing lots of an optical system extended up to the photometric position.

SUMMARY OF THE INVENTION

Accordingly, an object of this invention is to provide a high-performance exposure control device for an interchangeable-lens camera which eliminates the above-described factors preventing the determination of the correct exposure level.

The foregoing object of the invention has been achieved by the provision of an exposure control device in which, in determining the correct amount of exposure for an interchangeable-lens camera by using a photometric output ip obtained through a photographing lens, correction is made so that the photometric output ip and the open-aperture F number $A_{vmin}$ of the photographing lens satisfy a relation $2A_{vmin} \propto 1/ip$, and which, according to the invention, comprises: means for obtaining an amount of correction $mv_1$ to correct a deviation from the proportional relation attributed to a difference in optical characteristics between camera bodies and a difference in focal length between photographing lenses, an amount of correction $mv_2$ to correct a deviation from the proportional relation attributed to the difference in optical characteristics between camera bodies and a difference in exit pupil position between photographing lenses, an amount of correction $mv_3$ to correct a deviation from the proportional relation attributed to the difference in optical characteristics between camera bodies and a difference in vignetting factor between photographing lenses, and an amount of correction $mv_4$ to correct a deviation from the proportional relation attributed to the difference in optical characteristics between camera bodies and a difference in open-aperture F number between photographing lenses; and means for correcting the deviations from the proportional relation according to a sum of at least one, two, three and four of the amounts of correction $mv_1$, $mv_2$, $mv_3$ and $mv_4$.

In the exposure control device according to the invention, predetermined coefficients $a_1$, $a_2$, $a_3$, $a_4$, $b_1$ and $b_2$ stored in a memory in the camera body and data f, 1/EXP, VNT and $A_{vminef}$ stored in a memory of the photographing lens are preferably utilized to calculate the amounts of correction $mv_1$ through $mv_4$ according to the following equations (1), (2), (3) and (4):

$$mv_1 = a_1 \times 1/f \quad (1)$$

$$mv_2 = a_2 \times 1/EXP + b_1 \quad (2)$$

$$mv_3 = a_3 \times VNT \quad (3)$$

$$mv_4 = a_4 \times A_{vminef} + b_2 \quad (4)$$

where f is the focal length, EXP is the exit pupil position, VNT is the vignetting factor with an image having a predetermined height, an example of the image height being 6 mm, and $A_{vminef}$ is the open-aperture f number.

The coefficients $b_1$ and $b_2$ in equations (2) and (4) may be replaced by $c(=b_1+b_2)$ because the amounts of correction $mv_1$ through $mv_4$ are summed as described above.

In the exposure control device thus constructed, factors both on the photographing lens side and on the camera body side are taken into account for each of the combinations of photographing lenses and camera bodies, and therefore the deviations from the proportional relation (2) are corrected using the amounts of correction determined according to these factors.

The factors on the photographing lens side which prevent determination of the correct exposure level are stored in the memory such as a lens ROM of the photographing lens, while the factors on the camera body side are stored in the memory such as a ROM in the camera body. Therefore, even if the combination of the photographing lens and the camera body is changed, the correct amount of exposure can be readily obtained taking into account the factors both on the photographing lens side and on the camera body side of the new combination.

DESCRIPTION OF THE PREFERRED EMBODIMENTS

Figure 1:
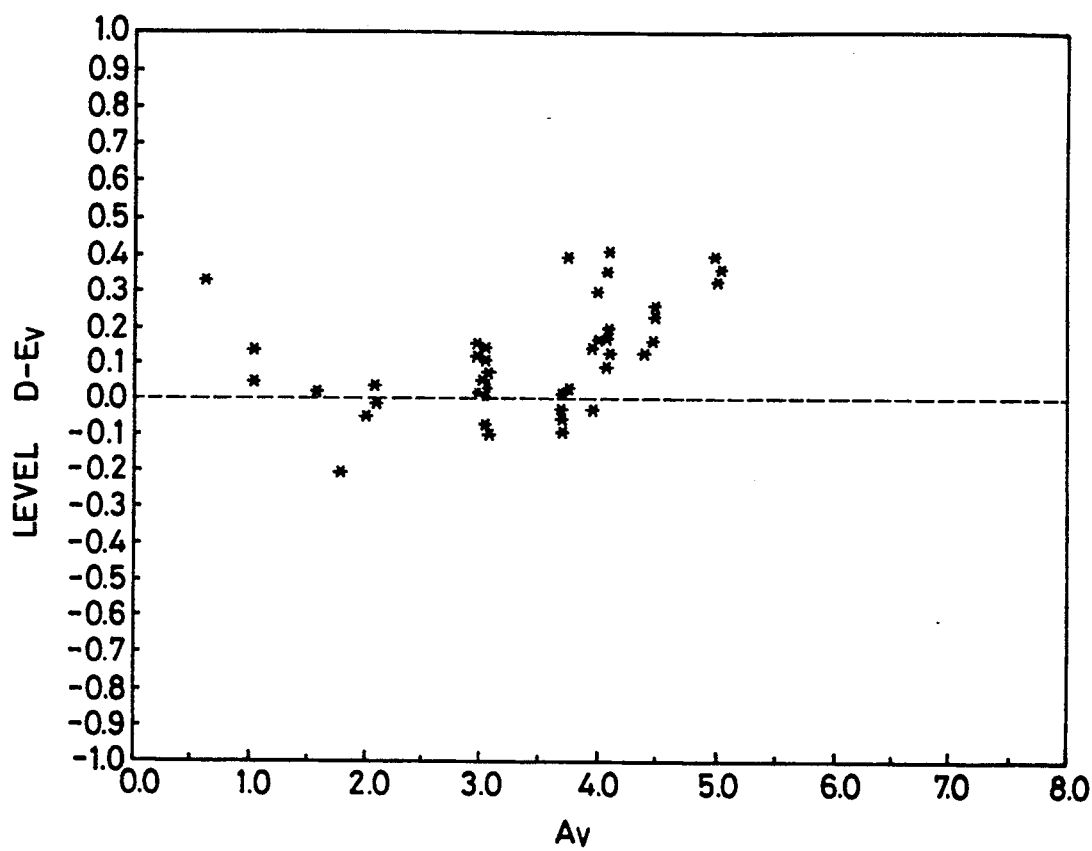
FIG. 1 is a graphical representation showing how an ideal photometric output and an actual photometric output depend on the photographing lens selected.
Figure 2:
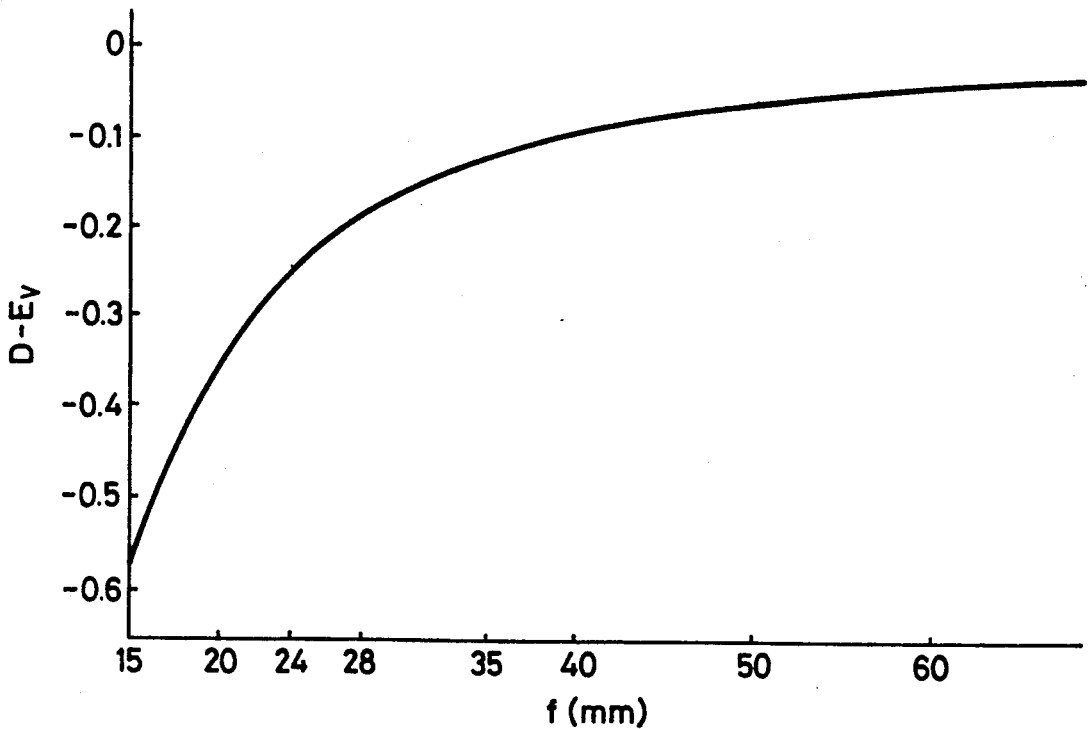
FIGS. 2, 3, 4(a), 4(b), and 5 are graphical representations showing various characteristic curves which are the results of investigations on various factors which prevent determination of a correct exposure level.
Figure 3:
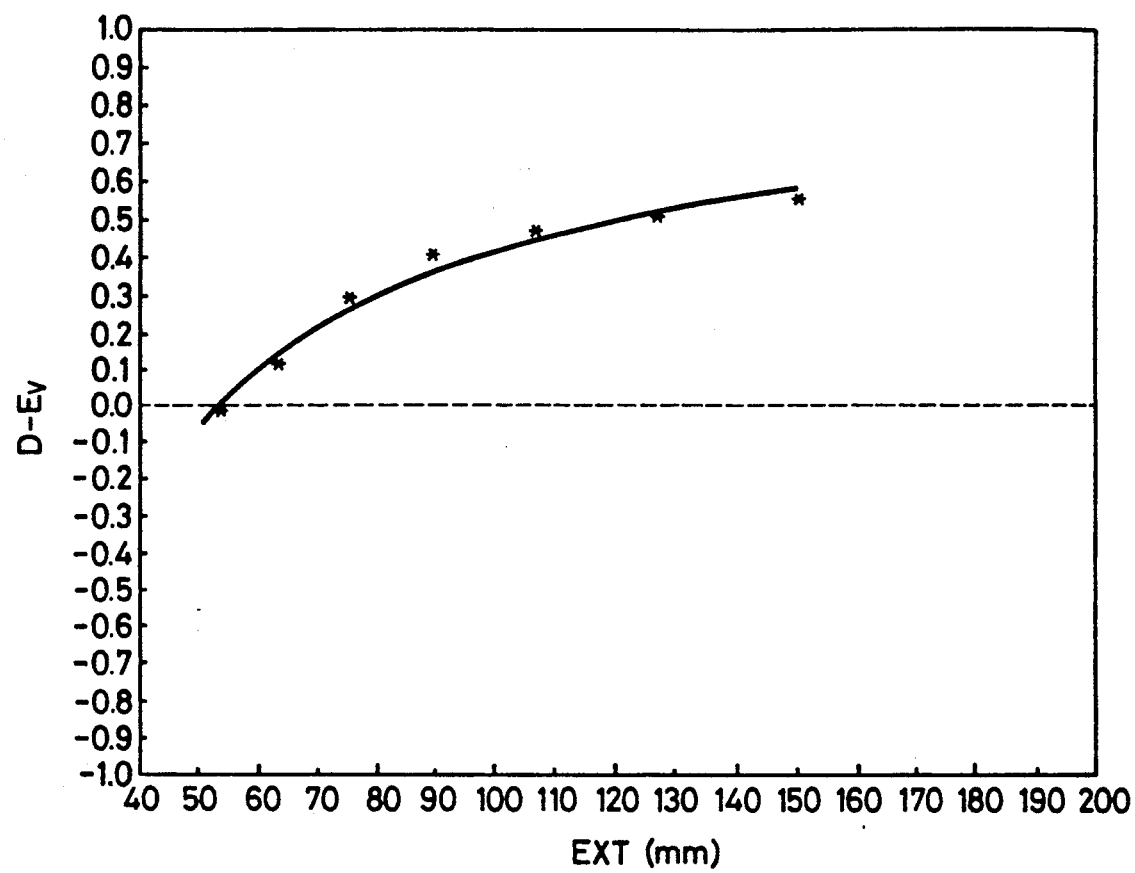
Figure 4A:
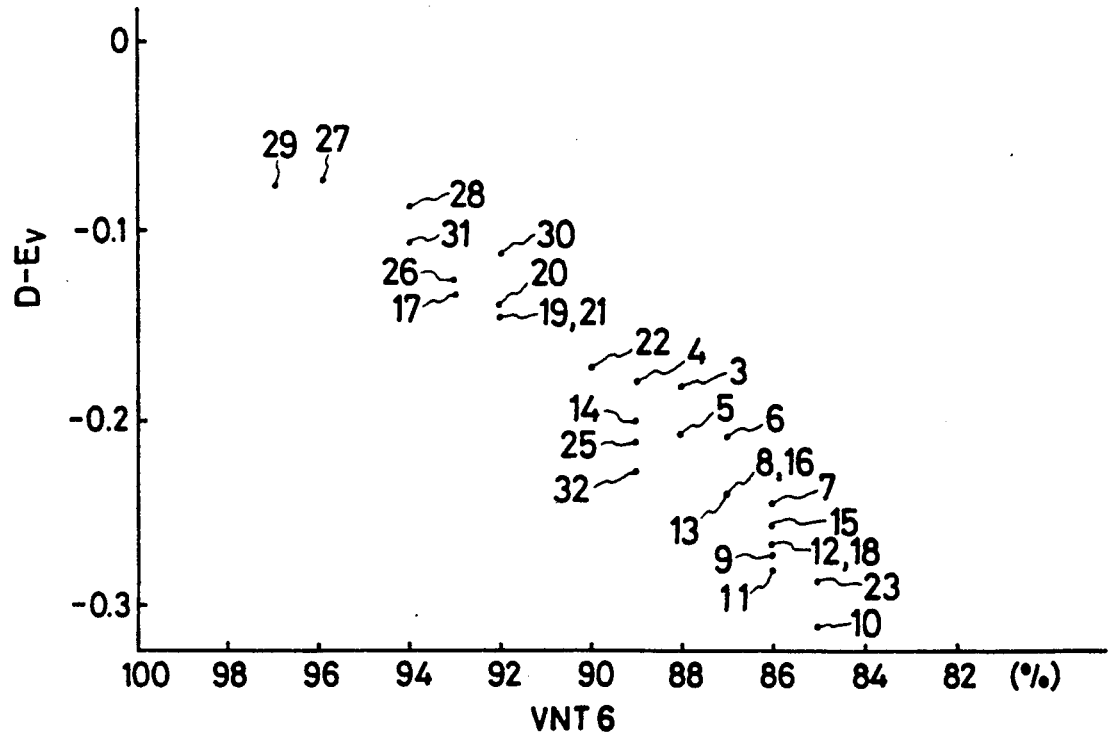
Figure 4B:
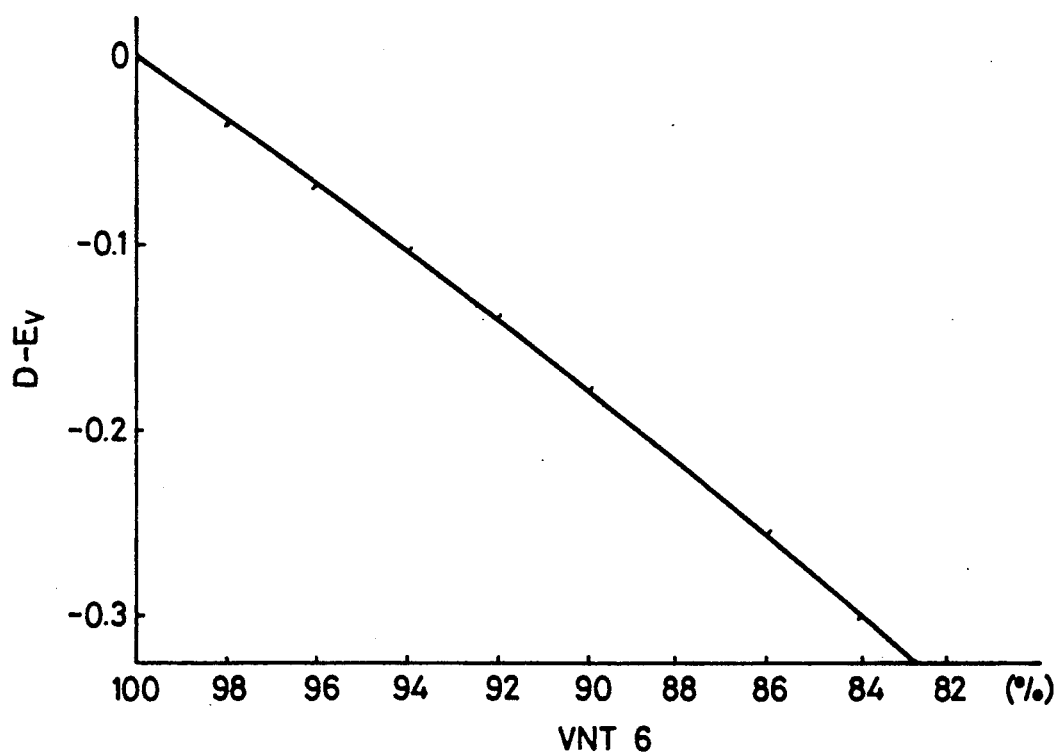
Figure 5:
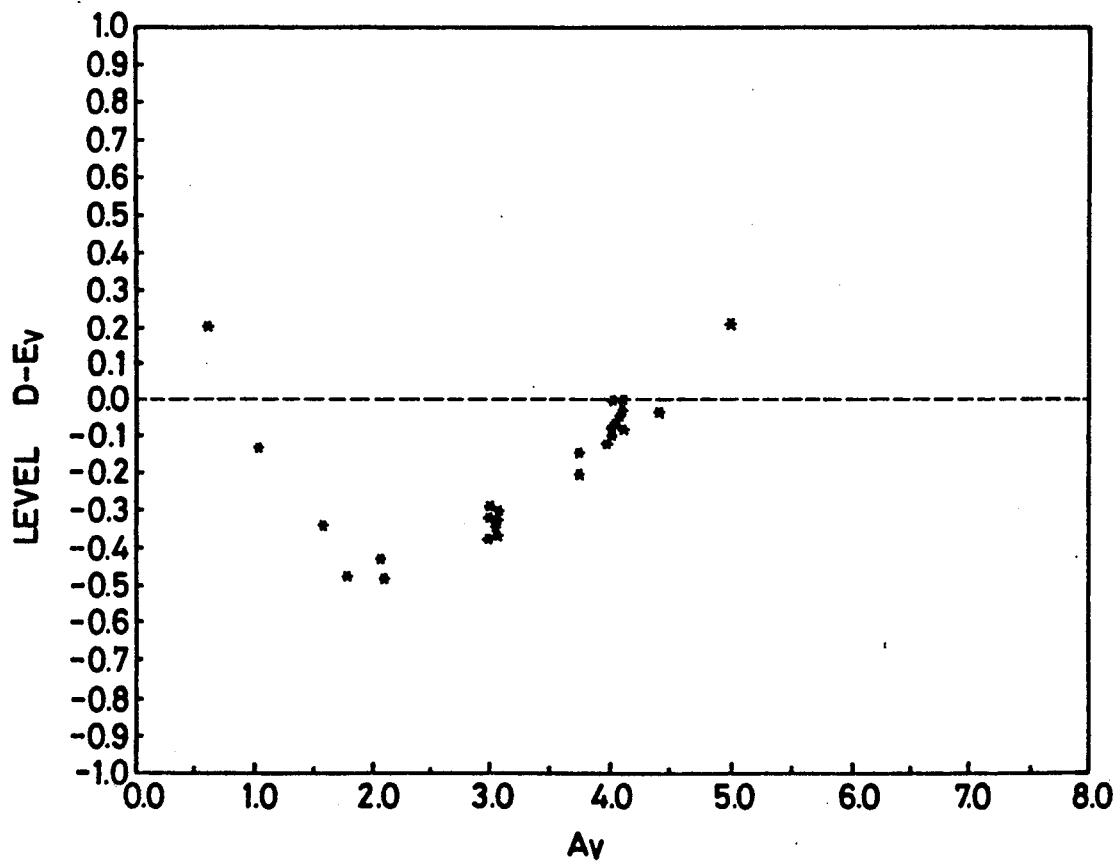

A preferred embodiment of the invention will now be described with reference to the accompanying drawings. These drawings have been simplified to make the invention more easily understood. The dimensions, configuration and arrangement of the various components of the invention are not limited to those shown in the drawings.

The exposure control device according to the invention can be constructed using various components of an interchangeable-lens camera essentially including a photographing lens and a camera body (hereinafter collectively referred to as merely "a camera," when applicable). First, a camera suitable for use in the invention will be described.

Figure 6:
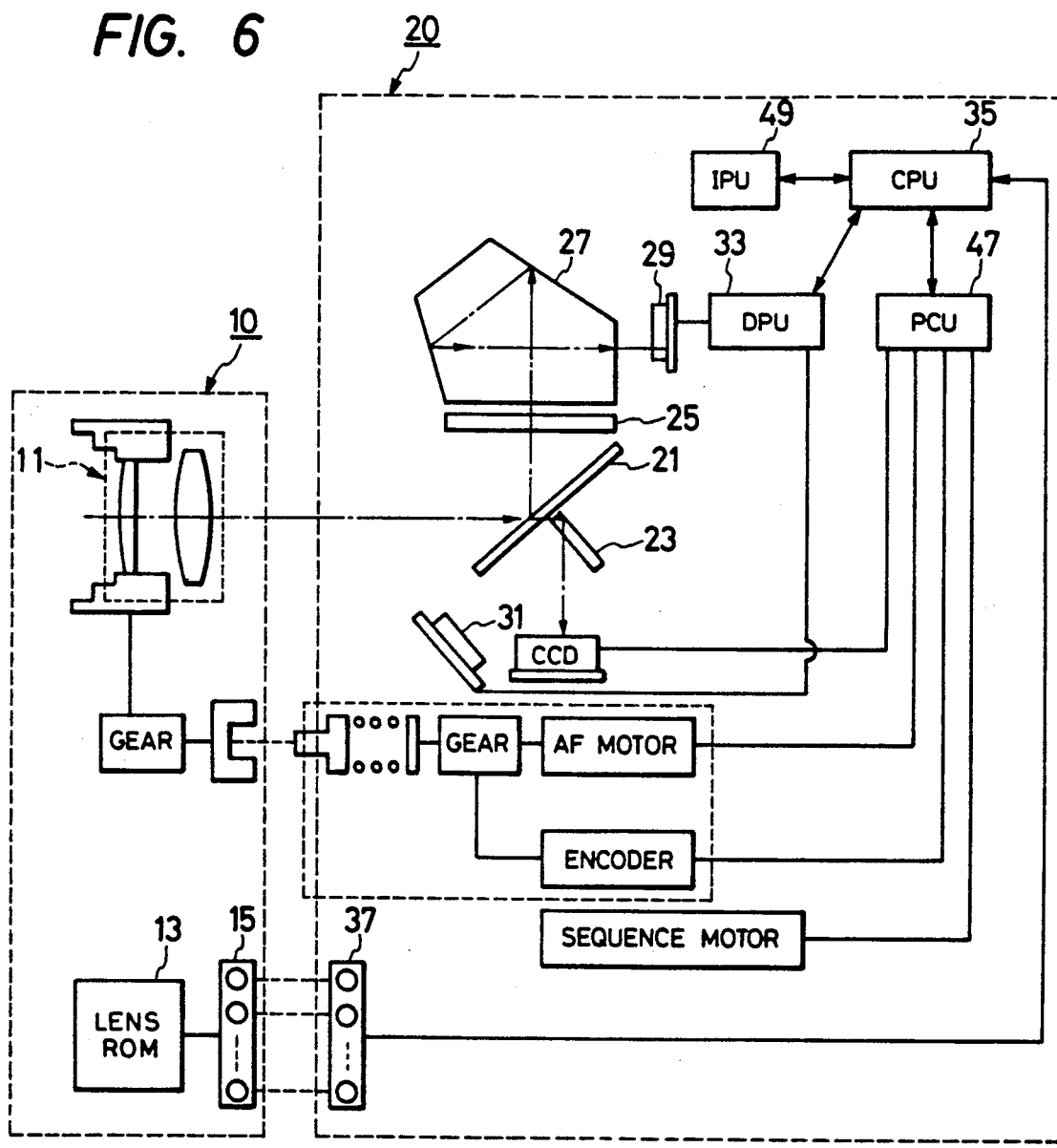
FIG. 6 is a block diagram showing essential components of an interchangeable-lens camera employing an exposure control device according to the invention.

FIG. 6 is a block diagram showing a camera to which the technical concept of the invention can be effectively applied. The camera is an automatic focus (AF) camera. Some of the components of the camera of FIG. 6, such as the AF mechanism, are not directly related to the invention, and therefore a detailed description of those components will be omitted.

In FIG. 6, reference numeral 10 designates a photographing lens, and 20, a camera body.

The photographing lens 10 is composed of a lens system 11 for transmitting light from an object, a lens ROM 13 capable of storing data inherent to the particular photographing lens, and a photographing lens electric contact group 15 for transmitting data between the lens ROM 13 and the camera body.

The camera body 2 includes a main mirror 21 and an auxiliary mirror 23 which control the direction of advancement of a light beam from the photographing lens, a focusing screen 25, a pentaprism 27, a first light detecting element 29 for measuring the intensity of a light beam passed through the pentaprism 27, and a second light detecting element 31 for measuring the intensity of a light beam from an electronic flash.

Figure 7:
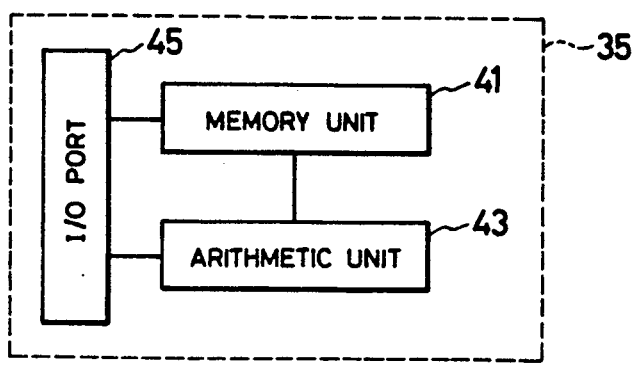
FIG. 7 is a block diagram showing an operating unit in a CPU of the camera shown in FIG. 6.

The camera body 20 further includes a microprocessor 33 (DPU) for subjecting the outputs of the light detecting elements 29 and 31 to various processing, and a central processing unit 35 (CPU) for performing a variety of arithmetic operations and controls for photographing operations. The output signal of the DPU 33 is applied to the CPU 35. The CPU 35 is connected to the lens ROM 13 through the photographing lens electrical contact group 15 and a camera body electrical contact group 37 coupled to the electrical contact group 15. The CPU 35, as shown in FIG. 7, includes a memory unit 41, and arithmetic unit 43. These two units are connected to the DPU 33 and the lens ROM 13 through an input/output port 45 in the CPU. Further in FIG. 6, reference numeral 47 designates an AF control section (PCU) for controlling the AF mechanism, and 49, a display control section (IPU) for controlling a display mechanism.

During manufacture, the camera thus constructed is subjected to the following tests:

With a variety of photographing lenses mounted on the camera body, the effects of parameters such as the $\cos^4$ law (focal length), exit pupil position, vignetting factor, and open-aperture F number, as described with reference to FIGS. 2 to 5, are measured. These measurements can be achieved, for instance, by measuring the output light detecting element 29 to obtain ip, or by suitable simulation. The investigation is given to another camera body, which is picked up from another manufacturing lot for instance, with a variety of photographing lenses mounted thereon.

Then, for each camera body, correcting equations which force the difference values in FIGS. 2 to 5 to zero are obtained. That is, with respect to the characteristic diagram of FIG. 2, the following equation is established:

$$\text{Amount of correction } mv_1 = a_1 \times 1/f \quad (1)$$

where f is the focal length. The coefficient $a_1$ can be obtained, for instance, by the method of least squares. Similarly, with respect to the characteristic curve of FIG. 3, the following equation is established:

$$\text{Amount of correction } mv_2 = a_2 \times 1/EXP + b_1 \quad (2)$$

where EXP is the exit pupil position. The values $a_2$ and $b_1$ can be obtained from this equation. Similarly, with respect to the characteristic curve of FIG. 6B, the following equation can be obtained:

$$\text{Amount of correction } mv_3 = a_3 \times VNT6 \quad (3)$$

where VNT6 is the vignetting factor with an image height of 6 mm for instance. The value $a_3$ can be obtained from this equation. Similarly, with respect to the characteristic curve of FIG. 5, the following equation can be established:

$$\text{Amount of correction } mv_4 = a_4 \times A_{vminef} + b_2 \quad (4)$$

where $A_{vminef}$ is the open-aperture F number. The values $a_4$ and $b_2$ can be obtained from the above equation.

The data $a_1$, $a_2$, $a_3$, $a_4$, $b_1$ and $b_2$ thus obtained are stored in the memory unit 41 of the CPU 35 in the respective camera body.

On the other hand, numerical values indicating the focal length, exit pupil position, vignetting factor and open-aperture F number of each photographing lens are stored in the lens ROM of the photographing lens.

In the camera thus constructed, a circuit for obtaining the amounts of correction $mv_1$, $mv_2$, $mv_3$ and $mv_4$ to correct a deviation from the above-described relation (2), and a circuit for correcting the deviation from relation (2) using the sum of these corrections are formed primarily by the lens ROM 13 and the CPU 35. The arrangement of these circuits together with the control operation thereof will be described.

Figure 8:
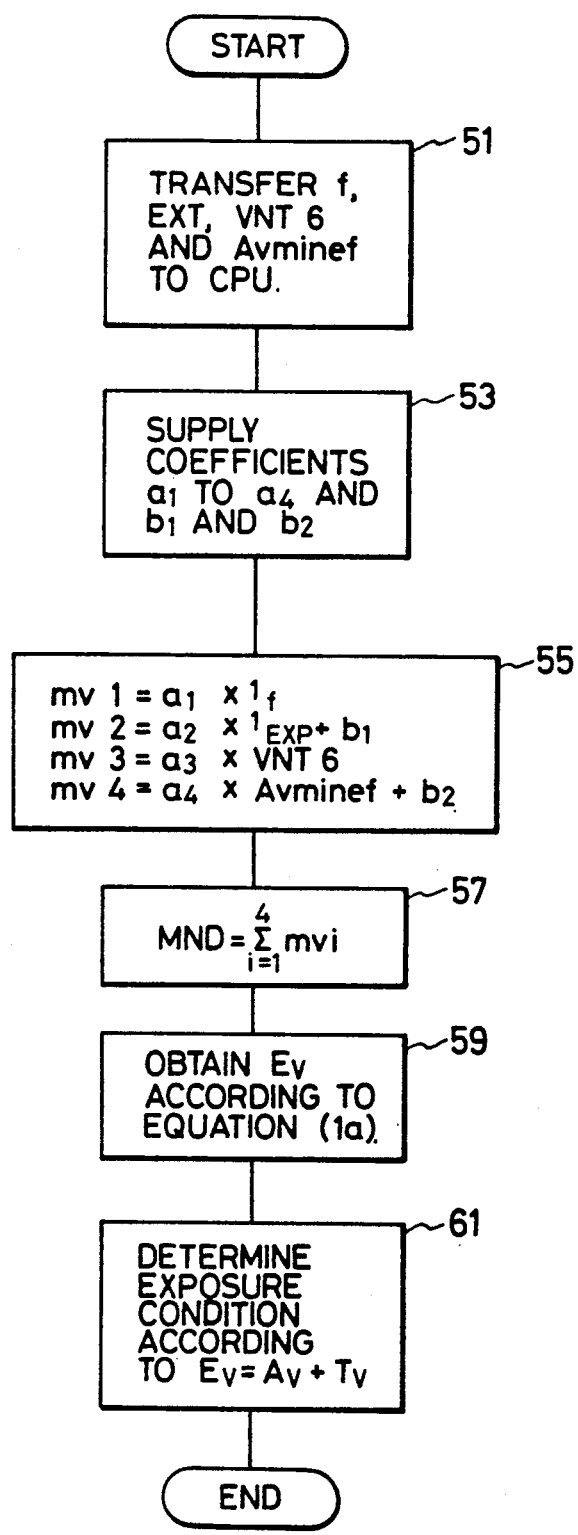
FIG. 8 is a flowchart provided for a description of an exposure control function of the functions of the CPU.

FIG. 8 is a flowchart mainly showing the operation of the CPU 35 for automatic exposure control of the camera described with reference to FIG. 6.

A selected one of the photographing lenses is mounted on a selected one of the camera bodies, and the data indicative of the focal length, exit pupil position, vignetting factor and open-aperture F number of the individual lens are transferred from the lens ROM 13 through the electrical contact groups 15 and 37 to the arithmetic unit 43 of the CPU 35 (Step 51).

The coefficients $a_1$ through $a_4$ and $b_1$ through $b_2$ are supplied from the memory unit 41 to the arithmetic unit 43 (Step 53).

In the arithmetic unit, the amounts of corrections $mv_1$ through $mv_4$ are calculated according to equations (1) through (4), respectively (Step 55).

In the arithmetic unit 43, the sum MND of $mv_1$ through $mv_4$ is obtained (Step 57).

Furthermore, in the arithmetic unit, the exposure level $E_v$ is obtained according to the following equation (1a):

$$E_v = \log_2 ip/(ips - B_{v6}) + 6 + S_v + A_{vmin} - A_{vsmin} - L_{fv} + MND \quad (1a)$$

where the variables are the same as described above with respect to equation (1).

After the exposure level $E_v$ has been determined, the exposure conditions can be determined by a shutter speed $T_v$ and an aperture value $A_v$ in combination (Step 61).

As is apparent from the above description, according to the chosen combination of camera body and photographing lens, an amount of correction for deviation from expression (2) is automatically determined, and the photometric output ip obtained through the photographing lens is utilized for correct exposure control.

The invention is not limited to the above-described embodiment. For instance, in the case where the photographing lens is a zoom lens and the parameters, namely, the focal length, exit pupil position, vignetting factor and open-aperture F number change greatly during zooming, a plurality of focal lengths, a plurality of exit pupil positions, a plurality of vignetting factors, and a plurality of open-aperture F numbers are preferably stored in the lens ROM, and a code board whose output code changes, for instance, with the operation of a zooming ring, is disposed in the zoom lens. Different values of the parameters (focal length, etc.) can be read out of the lens ROM for the selected zoom setting.

The equations for obtaining the amounts of correction $mv_1$ through $mv_4$ are not limited to the above-described equations (1) through (4). For instance, approximation expressions can be used which can provide a sufficient accuracy of correction.

The technical concept of the invention is applicable to the following cases:

First, a photographing lens is mounted on a plurality of camera bodies having different photometric systems. For each of the combinations of the photographing lens and camera bodies, correcting expressions are determined so that the difference values of FIGS. 2 through 5 are forced to zero, and the coefficients for the correcting expressions so derived are stored in memory in the camera bodies. As a result, for each combination of photographing lens and camera body, exposure control will be carried out correctly. Accordingly, a new photographing lens type using a different photometric system can be made to perform correctly with an existing camera body. That is, by storing coefficients suitable for the photographing lens in memory in the camera body, a correct exposure level will always be set. Examples of camera bodies differing in photometric systems are a camera body in which the photometric output ip is obtained, for instance, at the lens exit pupil position, a camera body in which a photometric averaging operation is carried out, and a camera body in which a spot photometric operation is conducted.

In a camera body which is capable of both averaging photometry and spot photometry, or in a camera body having a plurality of photometry systems, the coefficients $a_1$ through $a_4$, and $b_1$ and $b_2$ are determined with respect to each of the photometry systems in advance and stored in the memory unit 41 47 of the camera body. In other words, for a camera body having a plurality of photometry systems such as spot photometry and averaging photometry, it is necessary to store the above-described coefficients for each of the photometry systems in the memory unit.

A preferred example of the memory unit 41 is an $E^2PROM$ (Electrically Erasable Programmable Read Only Memory), which is capable of dealing with abrupt changes in the coefficients rapidly. Further, in case of a camera body employing a spot photometry system, parameters relating to the image height, such as the focal length f and the vignetting factor VNT, can be omitted, and therefore it is possible to obtain the amount of correction from only the sum of $mv_2$ and $mv_4$. In other words, the preferred functions of the circuit for obtaining the amounts of corrections $mv_1$ to $mv_4$ may be selected according to the photometry system to thereby obtain the sum of selected amounts of correction.

As is apparent from the above description, with the exposure control device according to the invention, the factors preventing determination of a correct exposure level, both on the photographing lens side and on the camera body side, are taken into account for each combination of photographing lens and camera body, and amounts of correction determined according to these factors are used to correct deviations from expression (2).

Accordingly, even in the case where a photographing lens is combined with a plurality of camera bodies selected from different manufacturing lots, or even in the case where the photographing lens is combined with a plurality of camera bodies having different photometric systems, a correct exposure level can always be obtained.

Thus, the exposure control device according to the invention provides excellent photographing performance in which, when an exposure level is to be determined using the photometric output ip obtained through a photographing lens, correction is automatically carried out so that the photometric output ip and the open-aperture F number $A_{vmin}$ of the photographing lens satisfies the following relation:

$$2A_{vmin} \propto 1/ip.$$

What is claimed is:

1. In an exposure control device in which, in determining a correct amount of exposure for an interchangeable-lens camera using a photometric output ip obtained through a photographing lens, correction is effected such that said photometric output ip and an open-aperture F number $A_{vmin}$ of said photographing lens system satisfy the proportional relation:

$$2A_{vmin} \propto 1/ip$$

the improvement comprising:
means for obtaining an amount of correction $mv_1$ to correct a deviation from said proportional relation attributed to a difference in optical characteristics between different camera bodies and a difference in focal length between different photographing lenses, wherein said amount of correction is determined according to a characteristic equation in which said amount of correction is inversely proportional to focal length and in which there is a coefficient of proportionality, said coefficient being predetermined such that said deviation from said proportional relation is substantially zero for one of said different camera bodies with each one of said different photographing lenses, said obtaining means further comprising means for storing said coefficient in said one camera body, and means for storing said focal length in said one lens; and
means for correcting said deviation from said proportional relation according to said amount of correction.

2. The device as claimed in claim 1, wherein said obtaining means comprises: means for storing coefficients $a_1$, $a_2$, $a_3$, $a_4$, $b_1$ and $b_2$ in said camera body and means for storing data f, 1/EXP, VNT and $A_{vminef}$ in a lens ROM of said photographing lens, and means for calculating said amounts of correction $mv_1$, $mv_2$, $mv_3$ and $mv_4$ according to the following equations:

$$mv_1 = a_1 \times 1/f$$

$$mv_2 = a_2 \times 1/EXP + b_1$$

$$mv_3 = a_3 \times VNT$$

$$mv_4 = a_4 \times A_{vminef} + b_2$$

where f is the focal length, EXP is an exit pupil position, VNT is vignetting factor with an image having a predetermined height, and $A_{vminef}$ is open-aperture F number.

3. In an exposure control device in which, in determining a correct amount of exposure for an interchangeable-lens camera using a photometric output ip obtained through a photographing lens, correction is effected such that said photometric output ip and an open-aperture F number $A_{vmin}$ of said photographing lens system satisfy the proportional relation:

$$2A_{vmin} \propto 1/ip$$

the improvement comprising:
means for obtaining an amount of correction $mv_2$ to correct a deviation from said proportional relation attributed to a difference in optical characteristics between different camera bodies and a difference in exit pupil position between different phototgraphing lenses, wherein said amount of correction is determined according to a characteristic equation in which said amount of correction is inversely proportional to exit pupil position and in which there is a coefficient of proportionality, said coefficient being predetermined such that said deviation from said proportional relation is substantially zero for one of said different camera bodies with each one of said different photographing lenses, said obtaining means further comprising means for storing said coefficient in said one camera body, and means for storing said exit pupil position in said one lens; and
means for correcting said deviation from said proportional relation according to said amount of correction.

4. In an exposure control device in which, in determining a correct amount of exposure for an interchangeable-lens camera using a photometric output ip obtained through a photographing lens, correction is effected such that said photometric output ip and an open-aperture F number $A_{vmin}$ of said photographing lens system satisfy the proportional relation:

$$2A_{vmin} \propto 1/ip$$

the improvement comprising:
means for obtaining an amount of correction $mv_3$ to correct a deviation from said proportional relation attributed to a difference in optical characteristics between different camera bodies and a difference in vignetting factor between different phototgraphing lenses, wherein said amount of correction is determined according to a characteristic equation in which said amount of correction is directly proportional to a vignetting factor and in which there is a coefficient of proportionality, said coefficient being predetermined such that said deviation from said proportional relation is substantially zero for one of said different camera bodies with each one of said different photographing lenses, said obtaining means further comprising means for storing said coefficient in said one camera body, and means for storing said vignetting factor in said one lens; and
means for correcting said deviation from said proportional relation according to said amount of correction.

5. In an exposure control device in which, in determining a correct amount of exposure for an interchangeable-lens camera using a photometric output ip obtained through a photographing lens, correction is effected such that said photometric output ip and an open-aperture F number $A_{vmin}$ of said photographing lens system satisfy the proportional relation:

$$2A_{vmin} \propto 1/ip$$

the improvement comprising:

means for obtaining an amount of correction $mv_4$ to correct a deviation from said proportional relation attributed to a difference in optical characteristics between different camera bodies and a difference in open-aperture F number between different phototgraphing lenses, wherein said amount of correction is determined according to a characteristic equation in which said amount of correction is directly proportional to open-aperture F number and in which there is a coefficient of proportionality, said coefficient being predetermined such that said deviation from said proportional relation is substantially zero for one of said different camera bodies with each one of said different photographing lenses, said obtaining means further comprising means for storing said coefficient in said one camera body, and means for storing said open-aperture F number in said one lens; and means for correcting said deviation from said proportional relation according to said amount of correction.

6. In an exposure control device in which, in determining a correct amount of exposure for an interchangeable-lens camera using a photometric output ip obtained through a photographing lens, correction is effected such that said photometric output ip and an open-aperture F number $A_{vmin}$ of said photographing lens system satisfy the proportional relation:

$$2A_{vmin} \propto 1/ip$$

the improvement comprising:

means for obtaining an amount of correction $mv_1$ to correct a deviation from said proportional relation attributed to a difference in optical characteristics between different camera bodies and a difference in focal length between different phototgraphing lenses;

means for obtaining an amount of correction $mv_2$ to correct a deviation from said proportional relation attributed to a difference in optical characteristics between said camera bodies and a difference in exit pupil position between said photographing lenses, an amount of correction $mv_3$ to correct a deviation from said proportional relation attributed to a difference in optical characteristics between said camera bodies and a difference in vignetting factor between said photographing lenses, and an amount of correction $mv_4$ to correct a deviation from said proportional relation attributed to a difference in optical characteristics between said camera bodies and a difference in open-aperture F number between said photographing lenses, wherein said obtaining means comprises means for storing coefficients in said camera body, means for storing data in a lens ROM of said photographing lens, and means for calculating said amounts of correction $mv_1$, $mv_2$, $mv_3$ and $mv_4$ according to the following equations:

$$mv_1 = a_1 \times 1/f$$

$$mv_2 = a_2 \times 1/EXP + b_1$$

$$mv_3 = a_3 \times VNT$$

$$mv_4 = a_4 \times A_{vminef} + b_2$$

where f is the focal length, EXP is an exit pupil position, VNT is a vignetting factor with an image having a predetermined height, and $A_{vminef}$ is an open-aperture F number, $a_1$, $a_2$, $a_3$, $a_4$, $b_1$, and $b_2$ are said coefficients, and f, 1/EXP, VNT, and $A_{vminef}$ are said data stored in said lens ROM;

said obtaining means further comprising means for correcting said deviation from said proportional relation according to the sum of at least one, two or three of said amounts of correction $mv_1$, $mv_2$, $mv_3$ and $mv_4$.

7. The device as claimed in claim 6, wherein said means for storing in said camera body is a ROM.

8. The device as claimed in claim 6, wherein said means for storing in said camera body is a ROM.

9. The device as claimed in claim 7, wherein said ROM is an $E^2PROM$.

10. The device as claimed in claim 8, wherein said ROM is an $E^2PROM$.

11. The device as claimed in claim 5, wherein said predetermined image height is 6 mm.

12. In an exposure control device in which, in determining a correct amount of exposure for an interchangeable-lens camera using a photometric output ip obtained through a photographing lens, correction is effected such that said photometric output ip and an open-aperture F number $A_{vmin}$ of said photographing lens system satisfy the proportional relation:

$$2A_{vmin} \propto 1/ip$$

the improvement comprising:

means for obtaining an amount of correction $mv_1$ to correct a deviation from said proportional relation attributed to a difference in optical characteristics between different camera bodies and a difference in focal length between different phototgraphing lenses;

means for obtaining an amount of correction $mv_2$ to correct a deviation from said proportional relation attributed to a difference in optical characteristics between said camera bodies and a difference in exit pupil position between said photographing lenses, an amount of correction $mv_3$ to correct a deviation from said proportional relation attributed to a difference in optical characteristics between said camera bodies and a difference in vignetting factor between said photographing lenses, and an amount of correction $mv_4$ to correct a deviation from said proportional relation attributed to a difference in optical characteristics between said camera bodies and a difference in open-aperture F number between said photographing lenses, wherein said obtaining means comprises means for storing coefficients in said camera body, means for storing data in a lens ROM of said photographing lens, and means for calculating said amounts of correction $mv_1$, $mv_2$, $mv_3$ and $mv_4$ according to the following equations:

$$mv_1 = a_1 \times 1/f$$

$$mv_2 = a_2 \times 1/EXP + b_1$$

$$mv_3 = a_3 \times VNT$$

$$mv_4 = a_4 \times A_{vminef} + b_2$$

where f is the focal length, EXP is an exit pupil position, VNT is a vignetting factor with an image having a predetermined height, and $A_{vminef}$ is an open-aperture F number, $a_1, a_2, a_3, a_4, b_1,$ and $b_2$ are said coefficients, and f, 1/EXP, VNT, and $A_{vminef}$ are said data stored in said lens ROM;

said obtaining means further comprising means for correcting said deviation from said proportional relation according to the sum of said amounts of correction $mv_1, mv_2, mv_3$ and $mv_4$.

13. The device as claimed in claim 12, wherein said camera body includes a plurality of photometry systems, and said means for storing in said camera body comprises means for storing coefficients $a_1$ through $a_4$, and $b_1$ and $b_2$ with respect to each of said photometry systems.

14. The device as claimed in claim 12, wherein said predetermined image height is 6 mm.

15. The device as claimed in claim 12, wherein said camera body includes a plurality of photometry systems, and said means for storing in said camera body comprises means for storing coefficients $a_1$ through $a_4$, and $b_1$ and $b_2$ with respect to each of said photometry systems.

16. An interchangeable photographing lens system for use in a TTL photographic interchangeable lens camera in which, in determining a correct amount of exposure for said camera using a photometric output ip obtained through said lens system, correction is effected such that the photometric output ip and an open-aperture F number $A_{vmin}$ of said photographing lens system satisfy the proportional relation:

$$2A_{vmin} \propto 1/ip$$

comprising means for storing data f, 1/EXP, VNT and $A_{vminef}$ where f is a focal length of said lens system, EXP is an exit pupil position, VNT is a vignetting factor with an image having a predetermined height, and $A_{vminef}$ is the open-aperture F number, said data being stored so that when said photographing lens system is attached to said camera, said correct amount of exposure is determined according to characteristic equations in which a first portion of said correction is inversely proportional to said focal length and in which there is a first coefficient of proportionality, a second portion of said correction is inversely proportional to said exit pupil position and in which there is a second coefficient of proportionality, a third portion of said correction is proportional to said vignetting factor and in which there is a third coefficient of proportionality, and a fourth portion of said correction is proportional to said open-aperture F number and in which there is a fourth coefficient of proportionality, said first, second, third and fourth coefficients being predetermined such that said deviation from said proportional relation is substantially zero for said photographing lens system.

17. A camera for a TTL photometric photographic interchangeable lens camera in which, in determining a correct amount of exposure for said camera using a photometric output ip obtained through said lens system, correction is effected such that the photometric output ip and an open-aperture F number $A_{vmin}$ of said photographing lens system satisfy the proportional relation:

$$2A_{vmin} \propto 1/ip$$

comprising means for storing coefficients $a_1, a_2, a_3, a_4, b_1$ and $b_2$ to be used in calculation of amounts of correction $mv_1, mv_2, mv_3$ and $mv_4$, and means for calculating said amounts of correction according to the following equations:

$$mv_1 = a_1 \times 1/f$$

$$mv_2 = a_2 \times 1/EXP + b_1$$

$$mv_3 = a_3 \times VNT$$

$$mv_4 = a_4 \times A_{vminef} + b_2$$

where f is the focal length, EXP is an exit pupil position, VNT is a vignetting factor with an image having a predetermined height, and $A_{vminef}$ is the open-aperture F number.

* * * * *

UNITED STATES PATENT AND TRADEMARK OFFICE
CERTIFICATE OF CORRECTION

PATENT NO.   : 5,012,268  
DATED        : April 30, 1991  
INVENTOR(S)  : Isamu HIRAI It is certified that error(s) appears in the above-identified patent and that said Letters Patent is hereby corrected as shown below:

On the title page, item [73] Assignee:

Delete "Asaha Kogaku Kogyo Kabushiki Kaisha, Tokyo, Japan" and insert --Asahi Kogaku Kogyo Kabushiki Kaisha, Tokyo, Japan--.

Signed and Sealed this

Twenty-third Day of July, 1996

*Attest:*

BRUCE LEHMAN

*Attesting Officer*    Commissioner of Patents and Trademarks